(12) United States Patent
Bandai (10) Patent No.: US 11,594,038 B2
(45) Date of Patent: Feb. 28, 2023

(54) INFORMATION PROCESSING DEVICE, INFORMATION PROCESSING SYSTEM, AND RECORDING MEDIUM RECORDING INFORMATION PROCESSING PROGRAM

(71) Applicant: TOYOTA JIDOSHA KABUSHIKI KAISHA, Toyota (JP)

(72) Inventor: Hiroyuki Bandai, Nagakute (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 212 days.

(21) Appl. No.: 17/066,864

(22) Filed: Oct. 9, 2020

(65) Prior Publication Data
US 2021/0142075 A1 May 13, 2021

(30) Foreign Application Priority Data
Nov. 11, 2019 (JP) .............................. JP2019-204266

(51) Int. Cl.
| | | |
|---|---|---|
| *G06V 20/58* | (2022.01) | |
| *G06V 20/56* | (2022.01) | |
| *G06V 10/96* | (2022.01) | |
| *H04N 7/18* | (2006.01) | |

(52) U.S. Cl.
CPC .............. *G06V 20/56* (2022.01); *G06V 10/96* (2022.01); *G06V 20/58* (2022.01); *G06V 2201/08* (2022.01); *H04N 7/181* (2013.01)

(58) Field of Classification Search
CPC ...... G06V 20/56; G06V 20/58; G06V 20/584; G06V 10/96; G06V 2201/08; H04N 7/181; G08G 1/166; G08G 1/0175
See application file for complete search history.

(56) References Cited

U.S. PATENT DOCUMENTS

| | | | |
|---|---|---|---|
| 9,576,480 B1* | 2/2017 | Shoshan | G08G 1/096716 |
| 10,455,185 B2* | 10/2019 | Bostick | H04N 7/188 |
| 2016/0150070 A1* | 5/2016 | Goren | G08G 1/0112 |
| | | | 455/418 |
| 2017/0278321 A1 | 9/2017 | Nishida et al. | |
| 2018/0204459 A1 | 7/2018 | Bradley et al. | |
| 2019/0108752 A1* | 4/2019 | Oe | G08G 1/0129 |
| 2019/0295410 A1* | 9/2019 | Nagata | G08G 1/04 |

FOREIGN PATENT DOCUMENTS

| | | |
|---|---|---|
| JP | 2006-221459 A | 8/2006 |
| JP | 2008-234414 A | 10/2008 |
| JP | 2017-174244 A | 9/2017 |

* cited by examiner

*Primary Examiner* — Matthew C Bella
*Assistant Examiner* — Kathleen M Broughton
(74) *Attorney, Agent, or Firm* — Sughrue Mion, PLLC (57) ABSTRACT

An information processing device that is configured to: receive, from each of two or more vehicles, image information captured by an image capture device installed at a vehicle, and vehicle information including position information on the vehicle; in a case in which a dangerously-driven vehicle has been detected by vehicles, establish a priority level for image processing of image information captured by the vehicles that have detected the dangerously-driven vehicle, in accordance with a predetermined condition; and based on the image information, perform image processing to identify a characteristic of the dangerously-driven vehicle in accordance with the established priority level.

15 Claims, 8 Drawing Sheets

INFORMATION PROCESSING DEVICE, INFORMATION PROCESSING SYSTEM, AND RECORDING MEDIUM RECORDING INFORMATION PROCESSING PROGRAM

CROSS-REFERENCE TO RELATED APPLICATION

This application is based on and claims priority under 35 USC 119 from Japanese Patent Application No. 2019-204266 filed on Nov. 11, 2019, the disclosure of which is incorporated by reference herein.

BACKGROUND

Technical Field

The present disclosure relates to an information processing device, information processing system, and a recording medium recording an information processing program.

Related Art

With the advent of connected cars having a function of connecting to a communication network such as the Internet, it is now possible to receive various information services by communicating with a cloud server.

For example, in Japanese Patent Application Laid-open No. 2017-174244, an information providing device is proposed that is connected via a network to a vehicle controlled based on recognition results by an external world recognition technology, and that provides a vehicle with information about the possibility of failure of external recognition based on conditions when external world recognition failure has occurred in the past. In detail, when a failure such as non-detection or erroneous detection occurs in the external environment recognition device of the connected car, it has been proposed to store the abnormality in association with the external traveling environment, such as the vehicle position and the weather.

However, in the technique disclosed in Japanese Patent Application Laid-Open No. 2017-174244, various information from the connected car needs to be collected in an information processing device such as a cloud server and a large amount of information processing must be performed, resulting n a high processing load and a delayed response. Accordingly, there is room for improvement.

SUMMARY

One aspect of the present disclosure is an information processing device, including: a receiver unit configured to receive, from each of two or more vehicles, both image information captured by an image capture unit installed at the vehicle, and vehicle information including position information on the vehicle; a setting unit configured to, in a case in which a dangerously-driven vehicle has been detected by plural vehicles, establish a priority level for image processing of, among the received image information, plural image information captured by the plural vehicles that have detected the dangerously-driven vehicle, in accordance with a predetermined condition; and an image processing unit configured to, based on the image information, perform image processing to identify a characteristic of the dangerously-driven vehicle in accordance with the established priority level.

DETAILED DESCRIPTION

Figure 1:
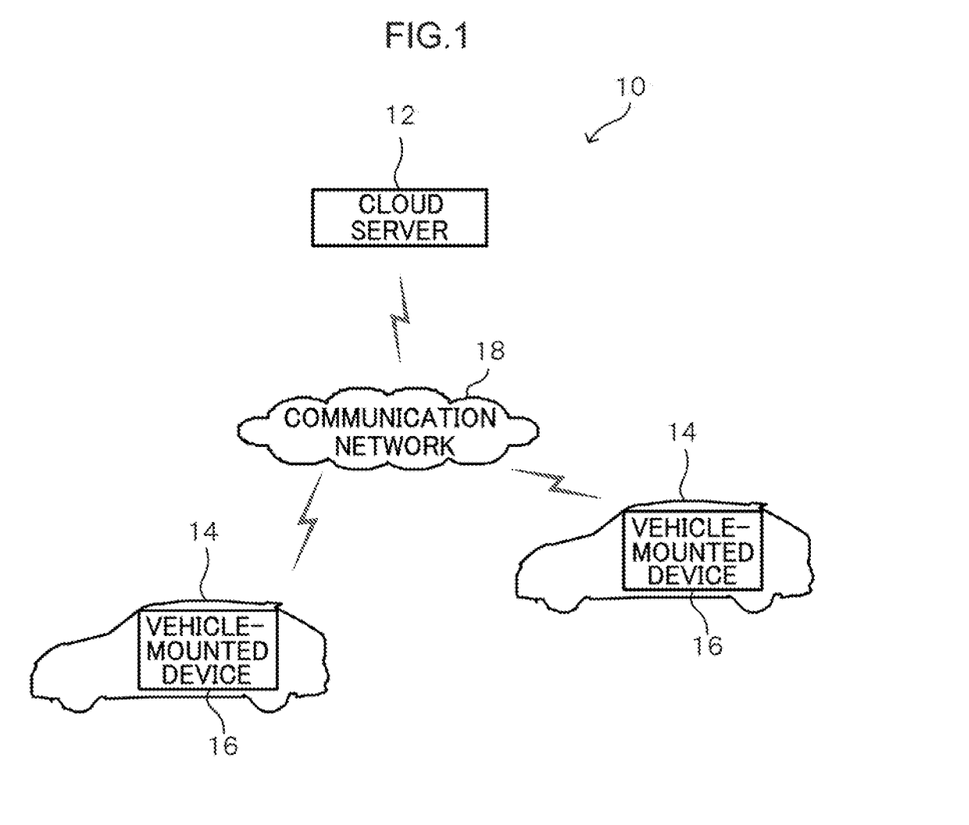
FIG. 1 is a block diagram illustrating a schematic configuration of an information processing system 10 according to the present embodiment.

An example of an embodiment of the present disclosure is described in detail hereinafter with reference to the drawings. FIG. 1 is a block diagram illustrating a schematic configuration of an information processing system according to the present embodiment.

In an information processing system 10 according to the present embodiment, an in-vehicle device 16 mounted on a vehicle 14, and a cloud server 12 as an information processing device, are connected via a communication network 18. In the information processing system 10 according to the present embodiment, image information obtained by photography by a plurality of vehicle-mounted devices 16 is transmitted to the cloud server 12, and the cloud server 12 performs various types of image processing. As an example of the image processing, image processing for identifying dangerous driving of a vehicle such as tailgating, pulling-over, swerving, or the like is performed.

Figure 2:
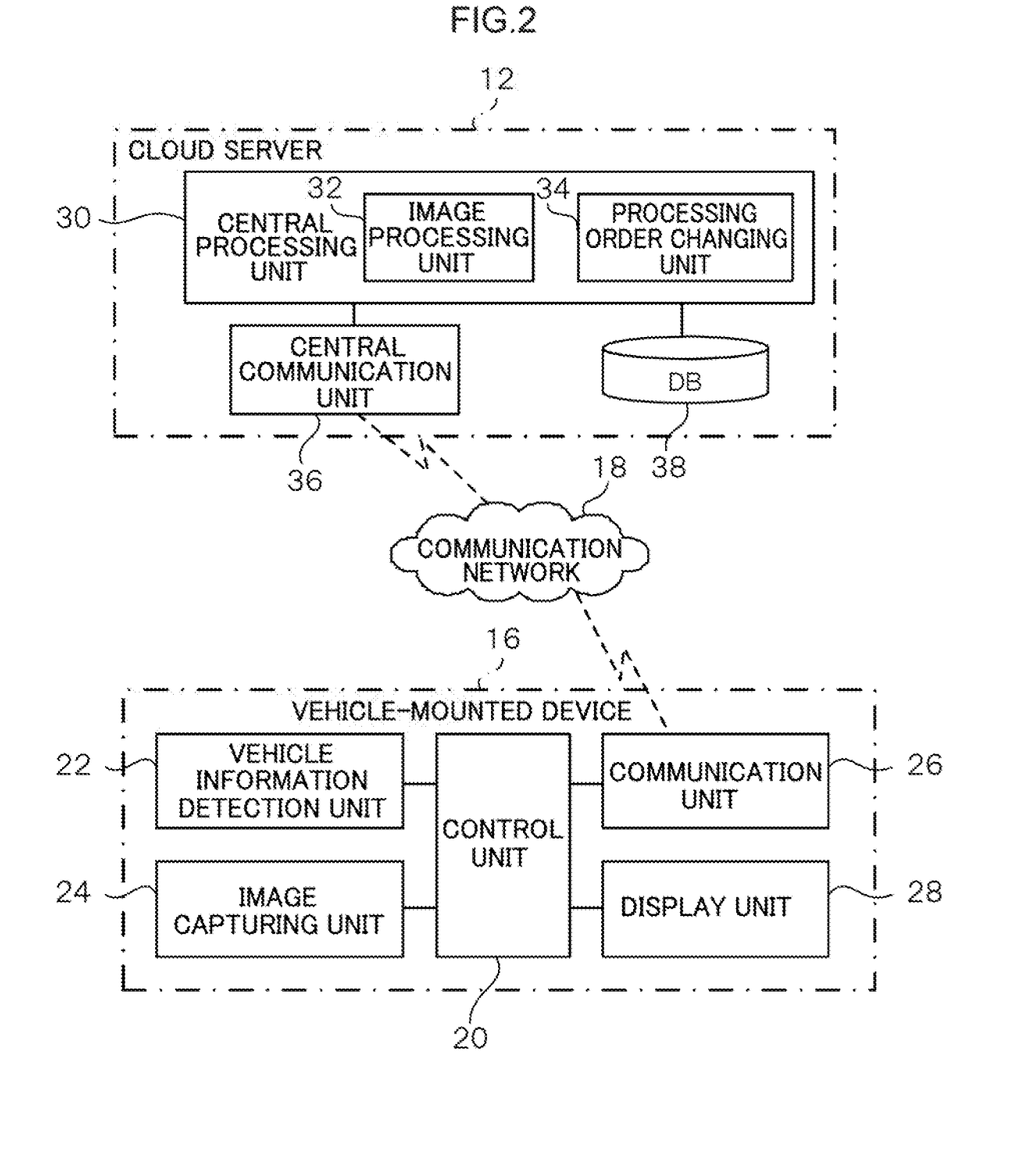
FIG. 2 is a block diagram showing a configuration of an in vehicle device and a cloud server in the information processing system according to the present embodiment.

FIG. 2 is a block diagram showing a configuration of an in-vehicle device and a cloud server in the information processing system according to the present embodiment.

The vehicle-mounted device 16 includes a control unit 20, a vehicle information detection unit 22, a photographing unit 24, a communication unit 26, and a display unit 28.

The vehicle information detection unit 22 detects vehicle information regarding the vehicle 14 including at least the position information of the vehicle 14. As the vehicle information, in addition to the position information, for example, vehicle information such as a vehicle speed acceleration, a steering angle, an accelerator position, and a route may be detected. More specifically, the vehicle information detection unit 22 can apply a plurality of different types of sensors and devices that acquire information indicating the state of the surrounding environment of the vehicle 14. Examples of the sensors and the devices include a sensor mounted on the vehicle 14 such as a vehicle speed sensor and an acceleration sensor, a GNSS (Global Navigation Satellite System) device, an in-vehicle communication device, a navigation system, and a radar device. The GNSS device receives GNSS signals from plural GNSS satellites, and measures the position of the host vehicle. The accuracy of measurement improves in accordance with an increase in the number of GNSS signals that the GNSS device can receive. The in-vehicle communication device is a communication device that carries out at least one of inter-vehicle communications with other vehicles 14 via the communication unit 26, or mad-vehicle communications with roadside devices. The navigation system includes a map information storage section that stores map information. On the basis of the position information obtained from the GNSS device and the map information stored in the map information storage section, the navigation system carries out processing that displays the position of the host vehicle on a map and that guides the host vehicle along a route to the destination. The radar device includes plural radars whose detection ranges differ from one another. The radar device detects objects such as pedestrians and other vehicles 14 and the like that exist in the surroundings of the host vehicle 14, and acquires relative positions and relative speeds between the detected objects and the host vehicle. Further, the radar device incorporates therein a processing device that processes the results of detecting objects in the surroundings. On the basis of changes in the relative positions and the relative speeds between the own vehicle and individual objects that are included in recent, plural results of detection, and the like, this processing device, excludes noise, roadside objects such as guard rails and the like, and the like from objects of monitoring, and tracks and monitors specific objects, such as pedestrians and other vehicles 14 and the like, as objects of monitoring. Further, the radar device outputs information on the relative positions and the relative speeds between the owner's vehicle and the individual objects of monitoring, and the like.

In the present embodiment, the image capturing unit 24 is provided at the rear of the vehicle 14 and captures an image to the rear of the vehicle 14. Further, the photographing unit 24 may further photograph at least one of the front side or the transverse side of the vehicle 14. Note that the image capturing section 24 may be provided on the vehicle 14 and capture an image of the vehicle surroundings toward at least one of the front, the side, or the rear of the vehicle 14. Further, the photographing unit 24 may further photograph the inside of the vehicle.

The communication unit 26 establishes communication with the cloud server 12 via the communication network 18 and performs transmission and reception of information such as image information obtained via imaging by the imaging unit 24 and vehicle information detected by the vehicle information detection unit 22.

The display unit 28 provides various kinds of information to the occupant by displaying the information. in the present embodiment, a warning about a dangerous driving vehicle is reported by displaying dangerous driving vehicle information provided from the cloud server 12. For example, information such as the shape (sedan, one-box, etc.), color, and license plate number of the dangerous driving vehicle is displayed is the dangerous driving vehicle information.

The operation unit 20 is configured by a general microcomputer including a CPU (Central Processing Unit), a ROM (Read. Only Memory), a RAM (Random Access Memory), and the like. Further, the control unit 20 performs control such as uploading image information representing an image captured by the image capturing unit 24 and vehicle information detected by the vehicle information detecting unit 22 at the time of capturing the image, to the cloud server 12. In addition, the control unit 20 may perform a process of detecting, as a dangerous vehicle, a vehicle 14 having a possibility of tailgating, pulling-over, swerving, or the like. For example, the vehicle 14 is identified in the image information obtained from the image capture by the image capturing unit 24, and the vehicle 14 having a size in the image of the identified vehicle 14 equal to or larger than a predetermined size is detected as a dangerous vehicle. Alternatively, the vehicle 14 in the image information may be specified, the inter-vehicle distance may be estimated from the size of the specified vehicle 14 in the image, and the vehicle 14 within a predetermined distance may be detected as a dangerous vehicle. Alternatively, when a radar device is provided as the vehicle information detection unit 22, the distance to a surrounding vehicle is detected based on the vehicle information, and the vehicle 14 that is a surrounding vehicle at a distance that is within a predetermined distance may be detected as a dangerous vehicle. Alternatively, a vehicle 14 where the distance to the surrounding vehicle detected based on the image information and the distance to the surrounding vehicle detected based on the vehicle information are both within a predetermined distance may be detected as a dangerous vehicle.

On the other hand, the cloud server 12 includes a central processing unit 30, a central communication unit 36, and a DB (database) 38.

The central processing unit 30 is configured by a general microcomputer including a CPU (Central Processing Unit), a ROM (Read Only Memory), a RAM (Random Access Memory), and the like. The central processing unit 30 has functions of an image processing unit 32 and a processing order changing unit 34. The central processing unit 30 performs processing to accumulate image information and vehicle information transmitted from the vehicle mounted device 16 in the DB 38 and converts the information into a database. In addition, based on the image information, processing is performed to specify the characteristics of the dangerously driven vehicle, such as tailgating, pulling-over, swerving, or the like. Each function of the central processing unit 30 is realized by executing a program stored in a ROM or the like. The processing order changing unit 34 corresponds to a setting unit, and the DB 38 corresponds to a receiving unit The image processing unit 3 performs various types of image processing on the image information received from the vehicle-mounted device 16 to detect traffic conditions, to detect disasters such as floods and landslides, and to specify characteristics of dangerously driven vehicles. In the present embodiment, as an example, the image processing unit 32 performs image processing on the image information received from the vehicle-mounted device 16 to specify the characteristics of the dangerously-driven vehicle. Specifically, processing is performed to specify features such as the color and the license plate number of the dangerous driving vehicle from the image information. Note that the image processing unit 32 may perform processing to detect a vehicle 14 having a possibility of tailgating, pulling-over, swerving, or the like as a dangerous vehicle, similarly to the control unit 20 of the vehicle-mounted device 16. For example, the vehicle 14 is identified in the image information, and the vehicle 14 having a size in the image of the identified vehicle 14 equal to or larger than a. predetermined size is detected as a dangerous vehicle. Alternatively, the vehicle 14 in the image information may be specified, the inter-vehicle distance may be estimated from the size of the specified vehicle 14 in the image, and the vehicle 14 within a predetermined distance may be detected as a dangerous vehicle. Alternatively, when a radar device is provided as the vehicle information detection unit 22, the distance to a surrounding vehicle is detected based on the vehicle information, and the vehicle 14 that is surrounding vehicle at a distance that is within a predetermined distance may be detected as a dangerous vehicle. Alternatively, a vehicle 14 where the distance to the surrounding vehicle detected based on the image information and the distance to the surrounding vehicle detected based on the vehicle information are both within a predetermined distance may be detected as a dangerous vehicle. The surroundings are, for example, within a predetermined distance range around the vehicle 14 such as within a radius of 10 m around the vehicle 14.

The processing order changing unit 34 changes the processing order of the image processing performed by the image processing unit 32 when a dangerous driving vehicle is detected. Specifically, when a dangerous driving vehicle is detected, the priority level of the image information received from the vehicles 14 around the vehicle 14 in which the dangerous driving vehicle is detected is changed to be higher than for other vehicles 14, and the processing for identification of the dangerous driving vehicle is prioritized. In addition, the detection of the dangerous vehicle may be performed by the detection of the dangerous vehicle by the control unit 20 of the vehicle-mounted device 16 or the detection of the dangerous vehicle by the image processing unit 32 of the cloud server 12.

The central communication unit 36 establishes communication with the vehicle-mounted device 16 via the communication network 18 and transmits and receives information such as image information and vehicle information.

The D 38 receives the image information and the vehicle information from the vehicle-mounted device 16 and stores the image information and the vehicle information in association with received image information and vehicle information.

In the information processing system 10 configured as described above, the image information captured by the image capturing unit 24 of the vehicle-mounted device 16 is transmitted to the cloud server 12 together with the vehicle information including at least the position information, and accumulated in the DB 38.

The cloud server 12 specifies the characteristics of the dangerous driving vehicle such as tailgating, pulling-over, or swerving, by the image processing unit 32 performing the image processing based on the image information stored in the DB 38. Then, the cloud server 12 provides a service to provide notification of the information indicating the characteristics of the dangerous driving vehicle to the surrounding vehicles 14, and calls attention thereto.

However, since an enormous amount of image information is accumulated in the DB 38, if the image processing is performed in order, it takes a long time to identify the characteristics of the dangerous driving vehicle and the processing, load increases.

Therefore, in the present embodiment, when a dangerous driving vehicle is detected among a plurality of vehicles 14, the processing order changing unit 34 sets a priority order, in accordance with a predetermined condition, for image processing corresponding to a plurality of image information captured by the plurality of vehicles 14 among which the dangerous driving vehicle is detected. Then, the image processing unit 32 performs image processing for specifying the characteristics of the dangerously driven vehicle in accordance with the set priority order, so that the processing for specifying the dangerously driven vehicle can be expedited. Note that the predetermined conditions that can be applied for expediting image processing include, for example, at least one of the number of vehicles 14 around the vehicle 14 that detected the dangerous driving vehicle, the type of the vehicle 14 that detected the dangerous driving vehicle (for example, the size of the vehicle), and the vehicle speed of the vehicle 14 that detected the dangerous driving vehicle. Specifically, as the number of vehicles around the vehicle 14 that has detected the dangerously driving vehicle increases, the priority level for performing image processing is raised so that it becomes easier to identify the dangerously driving vehicle. That is, by raising the priority level for performing image processing, the characteristics of the dangerously driving vehicle can be identified more quickly. Alternatively, the smaller the vehicle type that detected the dangerous driving vehicle or the lower the power weight ratio of the vehicle 14 that detected the dangerous driving vehicle, the higher the possibility of dangerous driving. Therefore, these predetermined conditions can be used to increase the priority level for performing image processing so that the characteristics of the dangerously driving vehicle can be identified more quickly. Alternatively, the higher the vehicle speed that detected the dangerous driving vehicle, the higher the possibility of dangerous driving. Therefore, this predetermined condition can be used to increase the priority level for performing image processing so that it is possible to quickly identify the characteristics of the dangerous driving vehicle.

Next, the detailed processing performed in the information processing system 10 according to the present embodiment configured as described above will be described. Hereinafter, the first to third embodiments will be described as detailed processing examples.

First Exemplary Embodiment

Figure 3:
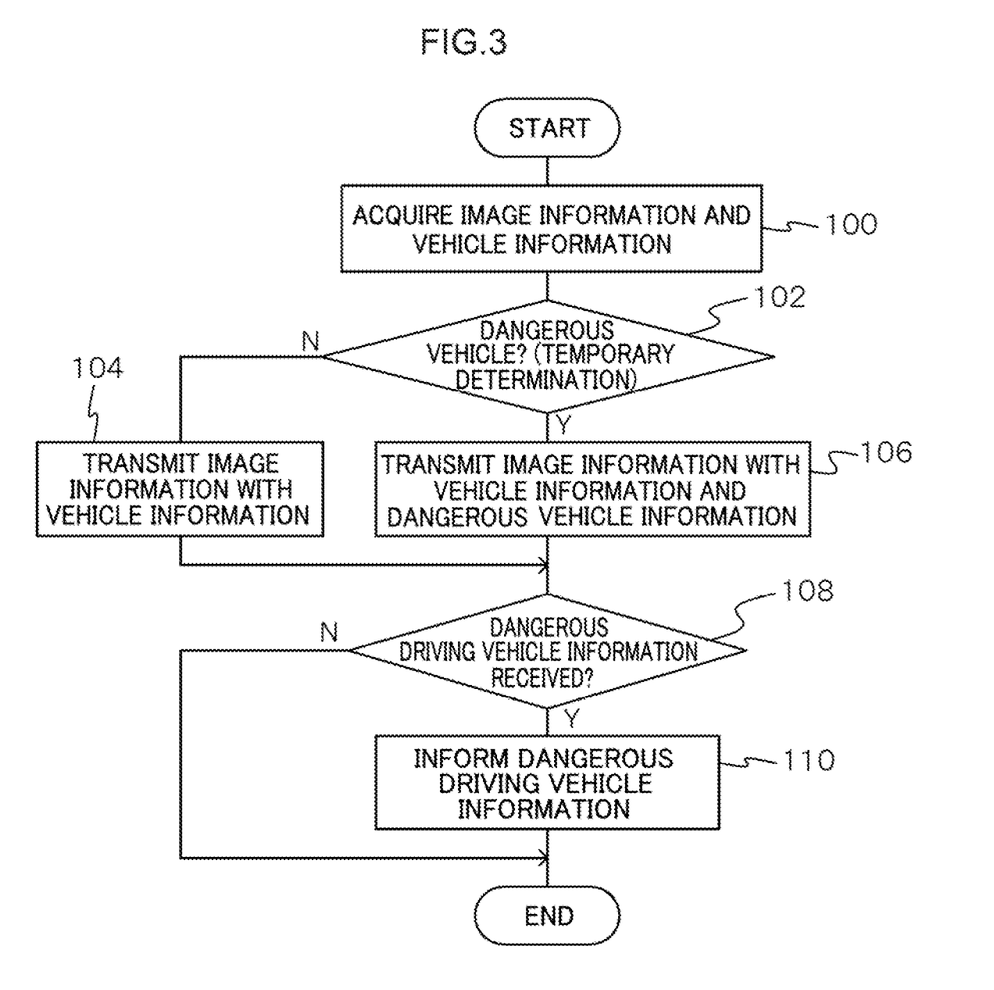
FIG. 3 is a flowchart showing an example of a flow of processing performed by the vehicle-mounted device of the information processing system according to the first embodiment.

First, a flow of detailed processing performed by the vehicle-mounted device 16 of the information processing, system 10 according to the first embodiment will be described. FIG. 3 is a flowchart showing an example of a flow of processing performed by the vehicle-mounted device 16 of the information processing system 10 according to the present embodiment. The processing in FIG. 3 is started, for example, every predetermined time interval (for example, every 10 seconds).

In step 100, the control unit 20 acquires the image information and the vehicle information, and proceeds to step 102. That is, in addition to acquiring the image information obtained by the image capture of the imaging part 24, the vehicle information detected by the vehicle information detection part 22 is acquired.

In step 102, the control unit 20 determines whether or not there is a dangerous vehicle that is thought to be tailgating, pulling-over, swerving, or the like. In this determination, the presence of a dangerous vehicle that may be a dangerous driving vehicle is determined its a temporary determination of a dangerous driving vehicle. For example, based on the image information, it is determined whether or not the size of a vehicle 14 to the rear in the image is equal to or larger than a predetermined size, thereby determining the presence or absence of a vehicle 14 that appears to be a tailgating vehicle. Alternatively, based on the image information, it is determined whether or not there is a dangerous vehicle whose distance to a nearby vehicle is within a predetermined distance. Alternatively, when a radar device is provided as the vehicle information detection unit 22, the distance to the nearby vehicle is detected based on the vehicle information, and it is determined whether or not there is a dangerous vehicle at a nearby vehicle distance that is within a predetermined distance. Alternatively, it is determined whether or not there is a dangerous vehicle where the distance to the surrounding vehicle detected based on the image information and the distance to the surrounding vehicle detected based on the vehicle information are both within a predetermined distance. When the determination is negative, the process proceeds to step 104, and when the determination is affirmative, the process proceeds to step 106.

In step 104, the control unit 20 adds the vehicle information to the image information, and transmits this information to the cloud server 12 via the communication unit 26 and the communication network 18, and the processing proceeds to step 108.

On the other hand, in step 106, the control unit 20 adds the vehicle information and the dangerous vehicle information to the image information, transmits the information to the cloud server 12 via the communication unit 26 and the communication network 18, and the processing proceeds to step 108. Steps 104 and 106 correspond to the transmitting unit.

In step 108, the control unit 20 determines whether or not dangerous driving vehicle information has been received from the cloud server 12. In this determination, it is determined whether or not the dangerous driving vehicle information specified by the processing of the cloud server 12 described below has been received from the cloud server 12. If the determination is affirmative, the processing proceeds to step 110, and if the determination is negative, the series of processing is ended.

In step 110, the control unit 20 informs the driver of dangerous driving vehicle information and ends the series of processing. For example, the control unit 20 gets the occupant's attention by displaying the dangerous driving vehicle information received from the cloud server 12 on the display unit 28. Further, the dangerous driving vehicle information may be reported by sound. When the image information of the dangerous driving vehicle is transmitted from the cloud server 12, the image of the dangerous driving vehicle may be displayed on the display unit 28.

Figure 4:
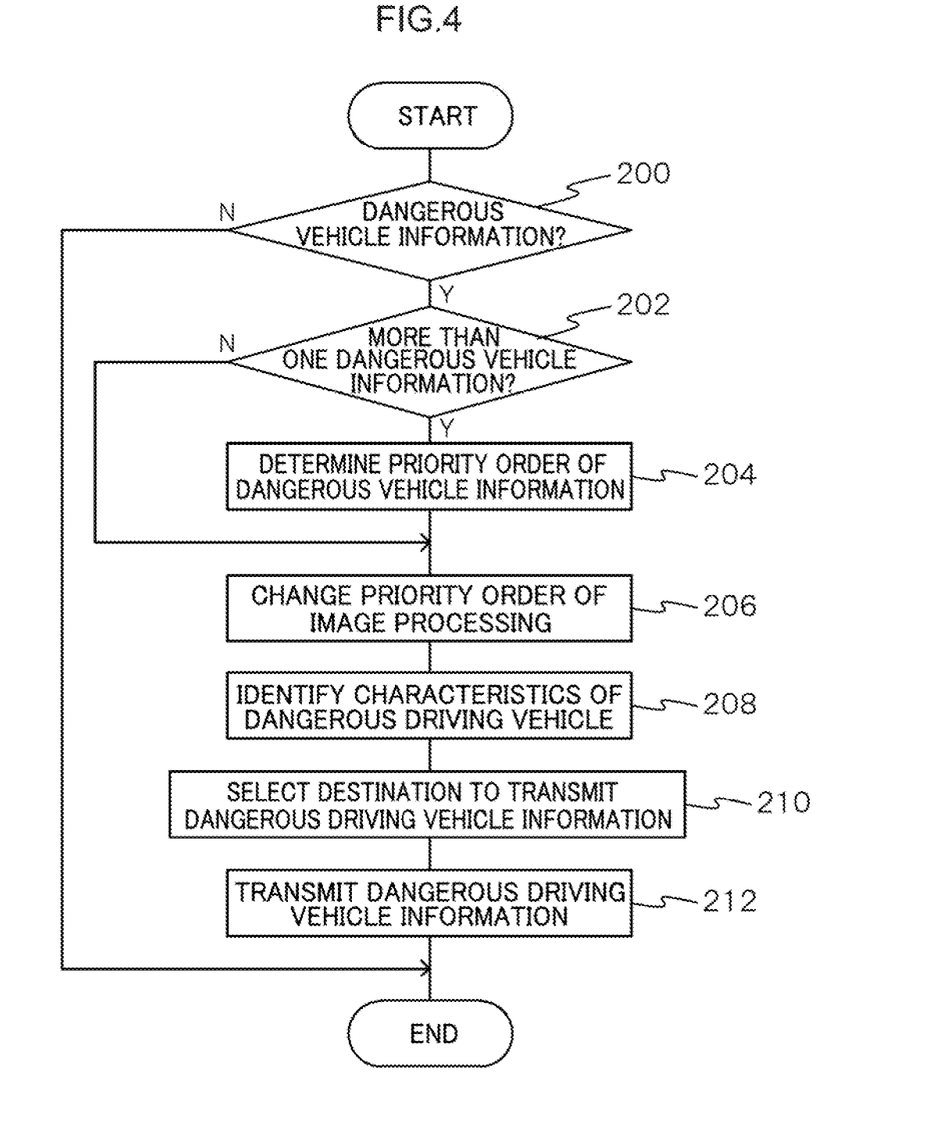
FIG. 4 is a flowchart illustrating an example of a flow of processing performed by a cloud server of the information processing system according to the first embodiment.

Next, detailed processing performed by the cloud server 12 of the information processing system 10 according to the first embodiment will be described. FIG. 4 is a flowchart illustrating an example of a flow of processing performed by a cloud server 12 of the information processing system 10 according to the present embodiment. Note that in the processing of FIG. 4, the image information is transmitted from the vehicle-mounted device 16 to the cloud server 12 at predetermined time intervals. Therefore, for example, the processing begins when the cloud server 12 receives the image information from the plurality of vehicle-mounted devices 16, and the image information is stored in the DB 38.

In step 200, the central processing unit 30 determines whether or not the image information received from the vehicle-mounted device 16 and stored in the DB 38 includes image information to which dangerous vehicle information has been added. That is, it is determined whether or not the image information transmitted from the vehicle-mounted device 16 includes image information to which dangerous vehicle information is added by the processing of step 106 (FIG. 3) described above. When the determination is negative, the series of processing is ended, and when the determination is affirmative, the processing proceeds to step 202.

In step 202, the central processing unit 30 determines whether or not there is a plurality of dangerous vehicle information. This determination determines whether or not a plurality of vehicle-mounted devices 16 have detected a dangerous vehicle. When the determination is affirmative, the processing proceeds to step 204, and when the determination is negative, the processing proceeds to step 206.

In step 204, the processing order changing unit 34 determines the priority order of the image information to which die dangerous vehicle information has been added, and the processing proceeds to step 206. That is, the processing order changing unit 34 sets the priority order of the image processing for the plurality of image information captured by the plurality of vehicles 14 that have detected a dangerous driving vehicle, according to a predetermined condition. Specifically, since it becomes easier to identify the dangerous driving vehicle when there are more vehicles 14 in the vicinity of the vehicle 14 that has detected the dangerous driving vehicle, the priority level is raised higher when there are more vehicles 14 in the vicinity. Alternatively, the smaller the vehicle type of the vehicle 14, the higher the possibility of dangerous driving, and therefore, the smaller the vehicle type, the higher the priority level. Alternatively, the higher the vehicle speed, the higher the possibility of dangerous driving, so the higher the vehicle speed, the higher the priority level.

In step 206, the processing order changing unit 34 changes the processing order of the image processing by the image processing unit 32, and proceeds to step 208. Specifically, the priority order of the image information transmitted from the vehicles 14 around the vehicle 14 that has transmitted the dangerous vehicle information is increased if one of these predetermined conditions is detected so that the dangerous driving vehicle can be quickly specified. That is, in step 206, the priority of processing the image information transmitted from the surrounding vehicles 14 is increased in order to quickly identify the dangerous driving vehicle, not only from the image information of one vehicle 14 but also from that of the surrounding vehicles.

In step 208, the image processing unit 32 identifies the characteristics of the dangerous driving vehicle from the image information by image processing, and proceeds to step 210. For example, if a vehicle 14 in the image information is specified, the inter-vehicle distance is estimated from the size of the specified vehicle 14 in the image, and the vehicle 14 exists within a predetermined distance, a dangerous driving vehicle is determined to exist. Then, processing is performed to specify features such as the color and the license plate number of the dangerous driving vehicle from the image information. That is, the dangerous driving vehicle is specified by sequentially performing the image processing on the image information according to the changed priority order, and the characteristics of the dangerous driving vehicle are specified, such as "a station wagon with license plate number XX-XX". Then, for example, when identification has been achieved with a probability of 80% or more from the image processing of the image information of three vehicles, the identification of the dangerous driving vehicle is ended. Alternatively, the identification of the dangerous driving vehicle may be stopped when the shape, color, and license plate number of a vehicle such as a station wagon, sedan, or truck can be identified. Alternatively, the process may be stopped when at least one of the shape, the color, or the license plate number can be specified.

In step 210, the central processing unit 30 selects a transmission destination dangerous driving vehicle information representing the characteristics of the dangerous driving vehicle identified by the image processing unit 32, and proceeds to step 212. The selection of the transmission destination selects, for example, a vehicle 14 in the vicinity of the vehicle 14 that has transmitted the dangerous vehicle information, a vehicle 14, among the vehicles 14 in the vicinity, of the vehicle 14 that has transmitted the dangerous vehicle information, or a vehicle 14 located in the traveling direction of the vehicle 14 that has transmitted the dangerous vehicle information.

In step 212, the central processing unit 30 transmits the dangerous driving vehicle information to the selected other vehicle 14 and ends the series of processing. As a result, in the vehicle 14 to which the dangerous driving vehicle information is transmitted, the determination in step 108 described above is affirmative, and the occupant is notified of the dangerous driving vehicle information. Note that step 212 corresponds to the notification unit.

As described above, in the present embodiment, when a dangerous driving vehicle is detected by a plurality of vehicles 14, the priority order of the image processing for the plurality of image information captured by the plurality of vehicles 14 that have detected the dangerous driving vehicle is set according to a predetermined condition, whereby it is possible to speed up the processing for identifying the dangerous driving vehicle.

Second Exemplary Embodiment

Next, detailed processing performed in the information processing system 10 according to the second embodiment will be described.

In the first embodiment, an example in which the presence or absence of a dangerous vehicle is detected at the side of the vehicle-mounted device 16 has been described, but in the present embodiment, the configuration is such that the presence, or absence of a dangerous vehicle is not detected by the vehicle-mounted device 16, and instead, the presence or absence of a dangerous vehicle is detected at the side of the cloud server 12.

Figure 5:
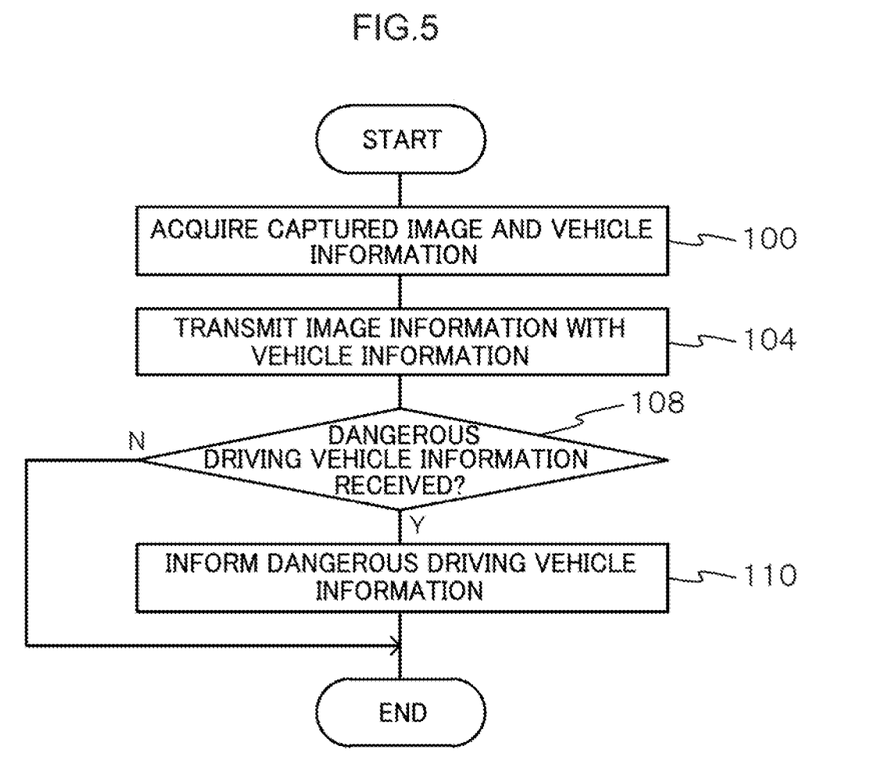
FIG. 5 is a flowchart illustrating an example of a flow of a process performed by an onboard unit of the information processing system according to the second embodiment.

FIG. 5 is a flowchart showing an example of a flow of processing performed by the vehicle mounted device 16 of the information processing system 10 according to the present embodiment, The processing in FIG. 5 is started, for example, every predetermined time interval (for example, every 10 seconds). Further, in the present embodiment, processing is performed by omitting the processing of steps 102 and 106 in FIG. 3, and explanation is given on the basis that processing that is the same as in FIG. 3 is assigned the same reference numeral.

In step 100, the control unit 20 acquires the image information and the vehicle information, and proceeds to step 104. That is, in addition to acquiring the image information obtained by the imaging|photography of the imaging part 24, the vehicle information detected by the vehicle information detection part 22 is acquired.

In step 104, the control unit 20 adds the vehicle information to the image information, and transmits this information to the cloud server 12 via the communication unit 26 and the communication network 18, and the processing proceeds to step 108.

In step 108, the control unit 20 determines whether or not dangerous driving vehicle information has been received from the cloud server 12. In this determination, it is determined whether or not the dangerous driving vehicle information specified by the processing of the cloud server 12 described below has been received. If the determination is affirmative, the processing proceeds to step 110, and if the determination is negative, the series of processing is ended.

In step 110, the control unit 20 informs the driver of dangerous driving vehicle information and ends the series of processing. For example, the control unit 20 gets the occupant's attention by displaying the dangerous driving vehicle information received from the cloud server 12 on the display unit 28. Further, the dangerous driving vehicle information may be reported by sound. When the image information of the dangerous driving vehicle is transmitted from the cloud server 12, the image of the dangerous driving vehicle may be displayed on the display unit 28.

Figure 6:
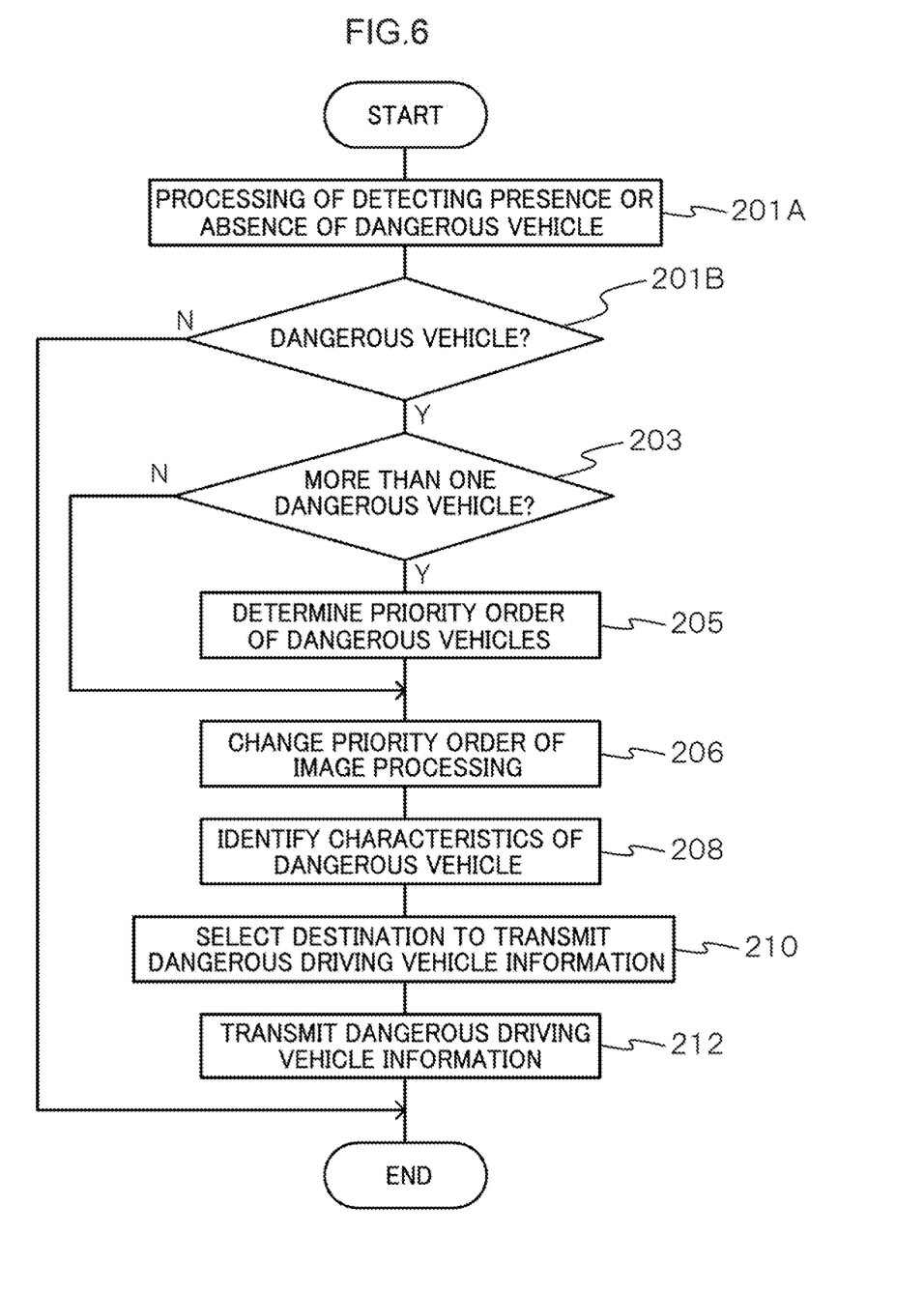
FIG. 6 is a flowchart showing an example of a flow of processing performed by the cloud server of the information processing system according to the first embodiment.

Next, detailed processing performed by the cloud server 12 of the information processing system 10 according to the second embodiment will be described, FIG. 6 is a flowchart illustrating an example of a flow of processing performed by a cloud server 12 of the information processing system 10 according to the present embodiment. Note that in the processing of FIG. 6, the image information is transmitted from the vehicle-tilted device 16 to the cloud server 12 at predetermined time intervals. Therefore, for example, the processing begins when the cloud server 12 receives the image information from the plurality of vehicle-mounted devices 16, and the image information is stored in the DB 38. Further, processing that is the same as in the processing of FIG. 4 will be described with the same reference numerals assigned.

In step 201A, the central processing unit 30 performs processing of detecting the presence or absence of a dangerous vehicle, and then proceeds to step 201B. In the process of detecting the presence or absence of a dangerous vehicle, for example, the image processing unit 32 sequential processes at least one of the image information or the vehicle information accumulated in the DB 38 to detect the presence or absence of a dangerous vehicle. For example, processing for detecting the presence or absence of a dangerous vehicle whose distance to a nearby vehicle is within a predetermined distance based on the image information is sequentially performed on the accumulated image information. Alternatively, based on the vehicle information (detection result of the radar device or the like) added to the image information accumulated in the DR 38. processing for detecting the presence or absence of a dangerous vehicle within a predetermined distance to the surrounding vehicles is sequentially performed on the accumulated vehicle information. Alternatively, based on the image information and the vehicle information, processing for detecting the presence or absence of a dangerous vehicle whose distance to the surrounding vehicle is within a predetermined distance is sequentially performed on the accumulated vehicle information. Note that step 201A corresponds to a detection unit.

In step 201B, the central processing unit 30 determines whether or not there is a dangerous vehicle from the result of the processing for detecting the presence or absence of a dangerous vehicle. If the determination is affirmative, the processing proceeds to the above-described step 3, and if the determination is negative, the series of processing is ended.

In step 203, the central processing unit 30 determines whether or not there is a plurality of dangerous vehicles. When the determination is affirmative the processing proceeds to step 205, and when the determination is negative, the processing proceeds to step 206.

In step 205, the processing order changing unit 34 determines the priority order of the image information in which a dangerous vehicle has been detected, and the processing proceeds to step 206. That is, the processing order changing unit 34 sets the priority order of the image processing for the plurality of image information captured by the plurality of vehicles 14 that have detected a dangerous vehicle, according to a predetermined condition. Specifically, since it becomes easier identify a dangerous driving, vehicle when there are tore vehicles 14 in the vicinity of a vehicle 14 that has detected a dangerous vehicle, the priority level is raised higher when there are more vehicles 14 in the vicinity. Alternatively, the smaller the vehicle type of the vehicle 14, the higher the possibility of dangerous driving, and therefore, the smaller the vehicle type, the higher the priority level. Alternatively, the higher the vehicle speed, the higher the possibility of dangerous driving, so the higher the vehicle speed, the higher the priority level.

In step 206, the processing order changing unit 34 changes the processing order of the image processing by the image processing unit 32, and proceeds to step 208. Specifically, the priority order of the image information transmitted from the vehicles 14 around the vehicle 14 that has transmitted the dangerous vehicle information is changed to be higher than that of other vehicles 14, and the dangerous driving vehicle is specified.

In step 208, the image processing unit 32 identifies the characteristics of the dangerous driving vehicle from the image information by image processing, and proceeds to step 210. For example, if a vehicle 14 in the image information is specified, the inter-vehicle distance is estimated from the size of the specified vehicle 14 in the image, and the vehicle 14 exists within a predetermined distance, a dangerous driving vehicle is determined to exist. Then, processing is performed to specify features such as the color and the license plate number of the dangerous driving vehicle from the image information. That is, the dangerous driving vehicle is specified by sequentially performing the image processing on the image information according to the changed priority order, and the characteristics of the dangerous driving vehicle are specified, such as "a station wagon with license plate number XX-XX". Then, for example, when identification has been achieved with a probability of 80% or more from the image processing of the image information of three vehicles, the identification of the dangerous driving vehicle is ended. Alternatively, the identification of the dangerous driving vehicle may be stopped when the shape, color, and license plate number of a vehicle such as a station wagon, sedan, or truck, can be identified. Alternatively, the process may be stopped when at least one of the shape, the color, or the license plate number can be specified.

In step 210, the central processing unit 30 selects a transmission destination of dangerous driving vehicle information representing the characteristics of the dangerous driving vehicle identified by the image processing unit 32, and proceeds to step 212. The selection of the transmission destination selects, for example, a vehicle 4 in the vicinity of the vehicle 14 that as transmitted the dangerous vehicle information, a vehicle 14, among the vehicles 14 in the vicinity of the vehicle 14 that has transmitted the dangerous vehicle information, that has transmitted image information including a dangerous driving vehicle, or a vehicle 14 located in the traveling direction of the vehicle 14 that has transmitted the dangerous vehicle information.

In step 212, the central processing unit 30 transmits the dangerous driving vehicle information to the selected other vehicle 14 and ends the series of processing. As a result, in the vehicle 14 to which the dangerous driving vehicle information is transmitted, the determination in step 108 described above is affirmative, and the occupant is notified of the dangerous driving vehicle information.

Third Exemplary Embodiment

Next, detailed processing performed in the information processing system 10 according to the third embodiment will be described.

In the first embodiment, the image information and the vehicle information are transmitted from all the vehicle-mounted devices 16 to the cloud server 12, but the present embodiment is an example in which the transmission of the image information and the vehicle information to the cloud server 12 is restricted. In the present embodiment, the presence or absence of a dangerous vehicle is determined at the side of each vehicle-mounted device 16, and only when a dangerous, vehicle is detected, the image information and the vehicle information are transmitted to the cloud server 12 from the vehicle-mounted device 16 of the vehicle 14 that has detected the dangerous vehicle and from the vehicle-mounted devices 16 of the surrounding vehicles 14.

Figure 7:
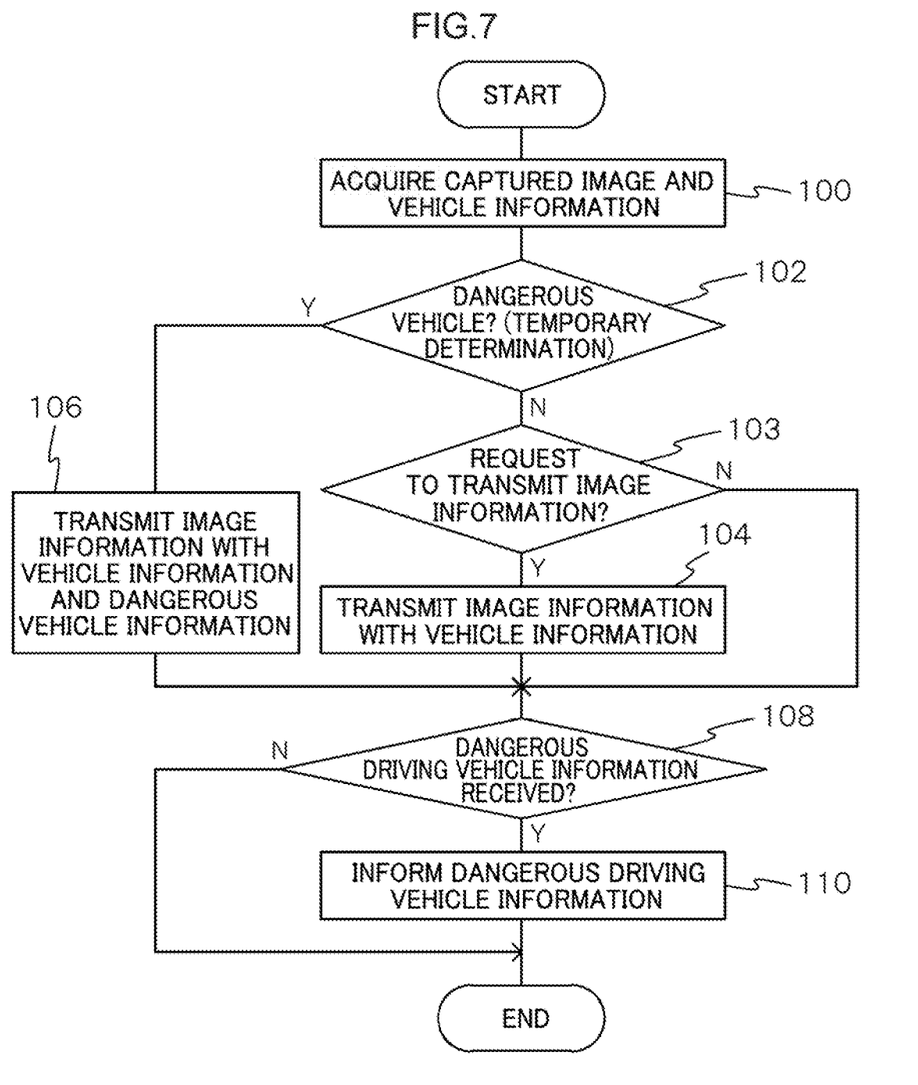
FIG. 7 is a flowchart showing an example of a flow of processing performed by the vehicle-mounted device of the information processing system according to the third embodiment.

FIG. 7 is a flowchart showing an example of a flow of processing performed by the vehicle-mounted device 16 of the information processing system 10 according to the present embodiment. Steps that are the same as those of FIG. 7 are assigned the same reference numerals and detailed explanations thereof are omitted. The processing in FIG. 7 is started, for example, every predetermined time interval (for example, every 10 seconds). Further, processing that is the same as in FIG. 3 will be described with the same reference numerals assigned.

In step 100, the control unit 20 acquires the image information and the vehicle information, and proceeds to step 102. That is, in addition to acquiring the image information obtained by the imaging photography of the imaging part 24, the vehicle information detected by the vehicle information detection part 22 is acquired.

In step 102, the control unit 20 determines whether or not there is a dangerous vehicle that is thought to be tailgating, pulling-over, swerving, or the like. In this determination, the presence of a dangerous vehicle that may be a dangerous driving vehicle 14 is determined as a temporary determination of a dangerous driving vehicle. For example, based on the image information, it is determined whether or not the size of a vehicle 14 to the rear in the image is equal to or larger than a predetermined size, thereby determining the presence or absence of a vehicle 14 that appears to be a tailgating vehicle. Alternatively, based on the image information, it is determined whether or not there is a dangerous vehicle whose distance to a nearby vehicle is within a predetermined distance. Alternatively, when a radar device is provided as the vehicle information detection unit 22, the distance to the nearby vehicle is detected based on the vehicle information, and it is determined whether or not there is a dangerous vehicle at a nearby vehicle distance that is within a predetermined distance. When the determination is negative, the process proceeds to step 103, and when the determination is affirmative, the process proceeds to step 106.

In step 103, the control unit 20 determines whether or not there is a request from the cloud server 12 to send image information. In the determination, it is determined whether or not the cloud server 12 has made a transmission request for the image information in order to acquire the image information, by the processing of step 201, which is described later. When the determination is affirmative, the processing proceeds to step 104, and when the determination is negative, the processing proceeds to step 108.

In step 104, the control unit 20 adds the vehicle information to the image information, and transmits this information to the cloud server 12 via the communication unit 26 and the communication network 18, and the processing proceeds to step 108.

On the other hand, in step 106, the control unit 20 adds the vehicle information and the dangerous vehicle information to the image information, transmits the information to the cloud server 12 via the communication unit 26 and the communication network 18, and the processing proceeds to step 108.

In step 108, the control unit 20 determines whether or not dangerous driving vehicle information has been received from the cloud server 12. In this determination, it is determined whether or not the dangerous driving vehicle information specified by the processing of the cloud server 12 described below has been received. If the determination is affirmative, the processing proceeds to step 110, and if the determination is negative, the series of processing is ended.

In step 110, the control unit 20 informs the driver of dangerous driving vehicle information and ends the series of processing. For example, the control unit 20 gets the occupant's attention by displaying the dangerous driving vehicle information received from the cloud server 12 on the display unit 28. Further, the dangerous driving vehicle information may be reported by sound, When the image information of the dangerous driving vehicle is transmitted from the cloud server 12, the image of the dangerous driving vehicle may be displayed on the display unit 28.

Figure 8:
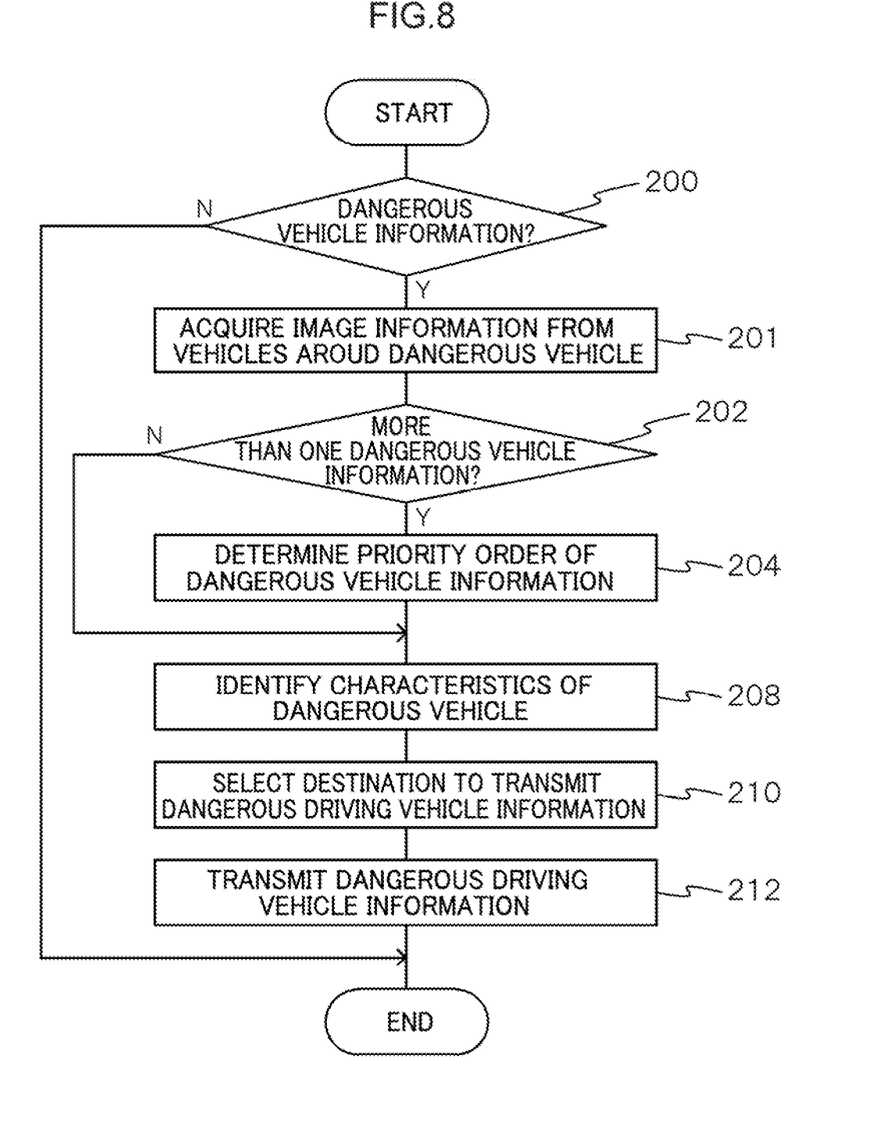
FIG. 8 is a flowchart illustrating an example of a flow of processing performed by a cloud server of the information processing system according to the third embodiment.

Next, detailed processing performed by the cloud server 12 of the information processing system 10 according to the third embodiment will be described. FIG. 8 is a flowchart illustrating an example of a flow of processing performed by a cloud server 12 of the information processing system 10 according to the present embodiment. Note that in the processing of FIG. 8, in a case in which a dangerous vehicle has been detected, the image information is transmitted from the vehicle-mounted device 16 to the cloud server 12 at predetermined time intervals. Therefore, for example, the processing begins when the cloud server 12 receives the image information from the vehicle mounted device 16, and the image information is stored in the DB 38.

In step 200, the central processing unit 30 determines whether or not the image information received from the vehicle-mounted device 16 and stored in the DB 38 includes image information to which dangerous vehicle information has been added. That is, it is determined whether or not the image information transmitted from the vehicle-mounted device 16 includes image information to which dangerous vehicle information is added by the processing of step 106 described above. When the determination is negative, the series of processing is ended, and when the determination is affirmative, the processing. proceeds to step 201.

In step 201, the central processing unit 30 acquires image information from the vehicles in the vicinity of the vehicle 14 that has transmitted the dangerous vehicle information, and proceeds, to step 202. As a result, the in-vehicle devices 16 of the surrounding vehicles affirm the determination at step 103 and the image information is transmitted from the surrounding vehicles by the processing at step 104, so that the central processing unit 30 acquires the transmitted image information.

In step 202, the central processing unit 30 determines whether or not there is a plurality of dangerous vehicle information. This determination determines whether or not a plurality of vehicle-mounted devices 16 have detected a dangerous vehicle. When the determination is affirmative, the processing proceeds to step 204, and when the determination is negative, the processing proceeds to step 206.

In step 204, the processing order changing unit 34 determines the priority order of the image information to which the dangerous vehicle information has been added, and the processing proceeds to step 208. That is, the processing order changing unit 34 sets the priority order of the image processing for the plurality of image information captured by the plurality of vehicles 14 that have detected a dangerous driving vehicle, according to a predetermined condition. Specifically, since it becomes easier to identify the dangerous driving vehicle when there are more vehicles 14 in the vicinity of the vehicle 14 that has detected the dangerous driving vehicle, the priority level is raised higher when there are more vehicles 14 in the vicinity. Alternatively, the smaller the vehicle type of the vehicle 14, the higher the possibility of dangerous driving, and therefore, the smaller the vehicle type, the higher the priority level. Alternatively, the higher the vehicle speed, the higher the possibility of dangerous driving, so the higher the vehicle speed, the higher the priority level.

In step 208, the image processing unit 32 identifies the characteristics of the dangerous driving vehicle from the image information by image processing, and proceeds to step 210. For example, if a vehicle 14 in the image information is specified, the inter-vehicle distance is estimated from the size of the specified vehicle 14 in the image, and the vehicle 14 exists within a predetermined distance, a dangerous driving vehicle is determined to exist. Then, processing is performed to specify features such as the color and the license plate number of the dangerous driving vehicle from the image information. That is, the dangerous driving vehicle is specified by sequentially performing the image processing on the image information according to the changed priority order, and the characteristics of the dangerous driving vehicle are specified, such as "a station wagon with license plate number XX-XX". Then, for example, when identification has been achieved with a probability of 80% or more from the image processing of the image information of three vehicles, the identification of the dangerous driving vehicle is ended. Alternatively, the identification of the dangerous driving vehicle may be stopped when the shape, color, and license plate number of a vehicle 14 such as a station wagon, sedan, or truck can be identified. Alternatively, the process may be stopped when at least one of the shape, the color, or the license plate number can be specified.

In step 210, the central processing unit 30 selects a transmission destination of dangerous driving vehicle information representing the characteristics of the dangerous driving vehicle identified by the image processing unit 32, and proceeds to step 212. The selection of the transmission destination selects, for example, a vehicle 14 in the vicinity of the vehicle 14 that has transmitted the dangerous vehicle information, a vehicle 14, among the vehicles 14 in the vicinity of the vehicle 14 that has transmitted the dangerous vehicle information, that has transmitted image information including a dangerous driving vehicle, or a vehicle 14 located in the traveling direction of the vehicle 14 that has transmitted the dangerous vehicle information.

In step 212, the central processing unit 30 transmits the dangerous driving vehicle information to the selected other vehicle 14 and ends the series of processing. As a result, in the vehicle 14 to which the dangerous driving vehicle information is transmitted, the determination in step 110 described above is affirmative, and the occupant is notified of the dangerous driving vehicle information.

As described above, in the present embodiment, the image information of the vehicle 14 that has detected the dangerous information and the image information of the vehicles 14 around the vehicle 14 that has detected the dangerous information is transmitted only when a dangerous vehicle is detected from the vehicle-mounted device 16. Therefore, image information will not be transmitted to the cloud server 12 more than necessary. As a result, the processing load on the cloud server 12 can be reduced and the processing for identifying the dangerous driving vehicle can be accelerated.

Further, the processing performed by each part of the information processing system 10 in each of the above-described embodiments has been described as software processing performed by executing a program, but it is not limited thereto. For example, the processing may be performed by hardware. Alternatively, the processing may be a combination of both software and hardware. In the case of software processing, the program may be stored in various kinds of non-transitory storage media and distributed.

In addition, the present invention is not limited by the foregoing description. In addition to the foregoing description, it will be clear that numerous modifications may be embodied within a technical scope not departing from the gist of the disclosure.

The invention claimed is:

1. An information processing device, comprising:
a memory; and
a processor coupled to the memory, the processor being configured to:
receive, from each of a plurality of vehicles, image information captured by an image capture device installed at a vehicle, and vehicle information including position information on the vehicle;
process at least one of the image information and the vehicle information to detect a presence or absence of a dangerously-driven vehicle;
when the presence of the dangerously-driven vehicle has been detected:
establish a priority level, in accordance with a predetermined condition, for image processing of a plurality of image information captured by the plurality of vehicles that have detected the presence of the dangerously-driven vehicle;
change, according to the established priority level, an image processing order of the plurality of image information captured by the plurality of vehicles that have detected the presence of the dangerously-driven vehicle; and
perform image processing on the plurality of image information to identify a characteristic of the dangerously-driven vehicle in accordance with the image processing order based on the established priority level; and
when the absence of the dangerously-driven vehicle has been detected, stop processing on the plurality of image information.

2. The information processing device of claim 1, wherein the processor is further configured to receive detection results of the dangerously-driven vehicle from the plurality of vehicles.

3. The information processing device of claim 2, wherein the processor receives the image information and the vehicle information from a vehicle that has detected the dangerously-driven vehicle and from a vehicle in the vicinity of the vehicle that has detected the dangerously-driven vehicle.

4. The information processing device of claim 1, further comprising a detection device that detects one of a presence and an absence of the dangerously-driven vehicle.

5. The information processing device of claim 1, wherein characteristic information representing the identified characteristic of the dangerously-driven vehicle identified by the processor is reported to the plurality of vehicles.

6. The information processing device of claim 5, wherein the processor, based on image processing results, when the dangerously-driven vehicle is included in the image information received from a vehicle in a vicinity of a vehicle that has detected the dangerously-driven vehicle, reports the characteristic information to the other vehicle.

7. The information processing device of claim 1, wherein the processor establishes the priority level such that a priority level of the image processing of the image information received from a vehicle in the vicinity of a vehicle that has detected the dangerously-driven vehicle, is higher than for a vehicle not in the vicinity of the vehicle that has detected the dangerously-driven vehicle.

8. The information processing device of claim 1, wherein the predetermined condition is at least one of: a number of nearby vehicles present in the vicinity of a vehicle that has detected the dangerously-driven vehicle, a vehicle model of the vehicle that has detected the dangerously-driven vehicle, and a vehicle speed of the vehicle that has detected the dangerously-driven vehicle, wherein:
in a case in which the number of nearby vehicles present in the vicinity of the vehicle that has detected the dangerously-driven vehicle is larger, the priority level is raised,
in a case in which the vehicle model of the vehicle indicates that the vehicle is smaller, the priority level is raised, and
in a case in which the vehicle speed of the vehicle is higher, the priority level is raised.

9. An information processing system, comprising:
the information processing device of claim 1; and
a vehicle comprising:
an image capture device that is installed in the vehicle and is configured to capture an image of the vehicle surroundings,
a vehicle information detection device configured to detect vehicle information including position information on the vehicle, and
a processor configured to transmit image information captured by the image capture device and the vehicle information detected by the vehicle information detection device.

10. The information processing device of claim 1, the processor being configured to:
perform image processing, according to the image processing order, on the plurality of image information captured by the plurality of vehicles that have detected the presence of the dangerously-driven vehicle prior to performing image processing on other image information in which the absence of a dangerously-driven vehicle has been detected.

11. The information processing device of claim 1, further comprising:
a cloud-based server that includes the memory and the processor.

12. A non-transitory recording medium storing a program that causes a computer to execute information processing, the information processing comprising:
receiving, from a plurality of vehicles, image information captured by an image capture device installed at a vehicle, and vehicle information including position information on the vehicle;

processing at least one of the image information and the vehicle information to detect a presence or absence of a dangerously-driven vehicle;

when the presence of the dangerously-driven vehicle has been detected:

establishing, a priority level for image processing of a plurality of image information captured by the plurality of vehicles that have detected the presence of the dangerously-driven vehicle, in accordance with a predetermined condition;

changing, according to the established priority level, an image processing order of the plurality of image information captured by the plurality of vehicles that have detected the presence of the dangerously-driven vehicle; and performing image processing on the plurality of image information to identify a characteristic of the dangerously-driven vehicle in accordance with the image processing order based on the established priority level; and when the absence of the dangerously-driven vehicle has been detected, stopping processing on the plurality of image information.

13. The non-transitory recording medium of claim 12, wherein the information processing further comprises:

performing image processing, according to the image processing order, on the plurality of image information captured by the plurality of vehicles that have detected the presence of the dangerously-driven vehicle prior to performing image processing on other image information in which the absence of a dangerously-driven vehicle has been detected.

14. An information processing method, comprising, by a processor:

receiving, from a plurality vehicles, image information captured by an image capture device installed at a vehicle, and vehicle information including position information on the vehicle;

processing at least one of the image information and the vehicle information to detect a presence or absence of a dangerously-driven vehicle;

when the presence of the dangerously-driven vehicle has been detected:

establishing, a priority level for image processing of a plurality of image information captured by the plurality of vehicles that have detected the presence of the dangerously-driven vehicle, in accordance with a predetermined condition;

changing, according to the established priority level, an image processing order of the plurality of image information captured by the plurality of vehicles that have detected the presence of the dangerously-driven vehicle; and performing image processing on the plurality of image information to identify a characteristic of the dangerously-driven vehicle in accordance with the image processing order based on the established priority level; and when the absence of the dangerously-driven vehicle has been detected, stopping processing on the plurality of image information.

15. The information processing method of claim 14, further comprising:

performing image processing, according to the image processing order, on the plurality of image information captured by the plurality of vehicles that have detected the presence of the dangerously-driven vehicle prior to performing image processing on other image information in which the absence of a dangerously-driven vehicle has been detected.

\* \* \* \* \*